US007942073B2

(12) United States Patent
Jonsson

(10) Patent No.: US 7,942,073 B2
(45) Date of Patent: May 17, 2011

(54) DEVICE FOR TRANSMITTING ROTARY MOTION

(75) Inventor: Lars Jonsson, Västerås (SE)

(73) Assignee: ABB Research Ltd., Zürich (CH)

( * ) Notice: Subject to any disclaimer, the term of this patent is extended or adjusted under 35 U.S.C. 154(b) by 411 days.

(21) Appl. No.: 12/086,230

(22) PCT Filed: Dec. 6, 2006

(86) PCT No.: PCT/SE2006/050552
§ 371 (c)(1),
(2), (4) Date: Jun. 9, 2008

(87) PCT Pub. No.: WO2007/067144
PCT Pub. Date: Jun. 14, 2007

(65) Prior Publication Data

US 2009/0151486 A1 Jun. 18, 2009

(30) Foreign Application Priority Data

Dec. 9, 2005 (SE) ....................................... 0502717

(51) Int. Cl.
*F16H 29/00* (2006.01)
*F16H 27/00* (2006.01)
*F16H 27/02* (2006.01)
*F16H 31/00* (2006.01)

(52) U.S. Cl. ............................... 74/116; 74/126; 74/112

(58) Field of Classification Search .................... 74/112, 74/116, 126, 128
See application file for complete search history.

(56) References Cited

U.S. PATENT DOCUMENTS

| | | | | |
|---|---|---|---|---|
| 1,079,048 A * | 11/1913 | Homans | 74/116 |
| 3,020,773 A * | 2/1962 | Golding | 74/138 |
| 3,422,941 A * | 1/1969 | Fredell | 192/12 B |
| 3,802,282 A * | 4/1974 | Cook | 74/128 |
| 3,812,730 A * | 5/1974 | Yanagawa | 74/112 |
| 5,123,291 A | 6/1992 | Sonntagbauer | |
| 6,838,629 B2 | 1/2005 | Baertl | |

FOREIGN PATENT DOCUMENTS

| | | |
|---|---|---|
| SE | 527560 C2 | 3/2006 |
| WO | WO-89/08924 A1 | 9/1989 |

OTHER PUBLICATIONS

PCT/ISA/210—International Search Report—Feb. 23, 2007.
PCT/ISA/237—Written Opinion of the International Searching Authority—Feb. 23, 2007.

* cited by examiner

*Primary Examiner* — Justin Krause
(74) *Attorney, Agent, or Firm* — Venable LLP; Eric J. Franklin

(57) ABSTRACT

Device for transmitting rotary motion in a diverter switch comprising a motion-transmitting member for transforming an alternating rotary motion of a drive shaft into a unidirected rotary motion of a driven body driven about driven shaft. The motion-transmitting member includes an intermediate body rotatable about an intermediate shaft. A mechanical energy accumulation member is connected to the driven body. The motion-transmitting member for transforming the alternating rotary motion of the drive shaft into a unidirected rotary motion of the driven shaft includes an intermediate motion member connected to a crank mechanism. The motion member includes an engagement mechanism for transforming the linear motion into a unidirected rotary motion of the intermediate shaft via drive members.

12 Claims, 5 Drawing Sheets

DEVICE FOR TRANSMITTING ROTARY MOTION

CROSS-REFERENCE TO RELATED APPLICATIONS

This application claims priority to Swedish patent application 0502717-2 filed 9 Dec. 2005 and is the national phase under 35 U.S.C. §371 of PCT/SE2006/050552 filed 6 Dec. 2006.

FIELD OF THE INVENTION

The present invention relates to a device for transmitting rotary motion, said device comprising a motion-transmitting member for transforming a driving body rotatable about an axis of rotation into rotary motion of a body driven about an axis of rotation.

The invention further relates to a use of the invented device, in which the driven body is adapted to operate contacts of a diverter switch.

BACKGROUND ART

In certain contexts, there is a need to achieve a short, powerful rotary motion in a definite direction. In certain cases, this can be quite unproblematic if the available drive source has a corresponding motion characteristic. However, this is not always the case. It may occur that the available drive source is of such a kind that it carries out rotary motion in one direction as well as in the other direction.

There are also situations where the drive source included does not immediately achieve a required powerful torque for the necessary short period. It may also occur that both of these imperfections occur simultaneously as far as the available drive source is concerned.

One example of such a situation is when operating a diverter switch in an on-load tap changer for controlling the voltage of a transformer. In this case, it may be advantageous that the operating motion always occurs in the same direction, and it should occur for a relatively short period of time. Usually, the drive source for such a diverter switch is in the form of the drive shaft that operates the selector switch, that is, the mechanism that sets the connections to new tap points in the winding of the transformer when a change of voltage is to take place. The drive shaft of the diverter switch rotates in different directions in dependence on whether it is a question of increasing or reducing the voltage of the transformer.

From WO 89/08924, a motion-transmitting mechanism is previously known, which is able to transform a rotary motion in one or the other direction into a unidirectional motion while at the same time concentrating the rotary motion with respect to time. The unidirection of the motion takes place by a special design of the spring, and the element directly cooperating therewith, that accumulate the energy and concentrate the rotary motion.

From SE 0401712-5, a motion-transmitting mechanism is previously known, which transforms a rotary motion in one or the other direction into a unidirectional motion which via, inter alia, a gear-wheel mechanism and shafts, transfers the rotary motion into an energy-storing system in the form of a spring unit. When the spring unit with a locking device is released, motion is transferred to a final shaft. The diverter selector switch and the whole drive package are surrounded by transformer oil.

This mechanism is dependent on a mechanical return of a rotary pulse from the spring unit to the retaining pawls of the gear wheels in order to ensure that these will mesh with each other. Under extreme temperature conditions, for ex-ample at very low temperatures of the oil (−40° C.), the viscosity of the oil is relatively high, and the returned rotary pulse may become too weak to ensure that the ratchet gearing will enter into a locking position.

The present invention seeks to provide an improved device for transmitting rotary motion, wherein the transmission function is ensured also under extreme temperature conditions.

SUMMARY OF THE INVENTION

According to an aspect of the present invention, there is provided a device for transmitting rotary motion in a diverter switch.

The invention is based, among other things, on the realization that the transformation of the alternating rotary motion into the unidirected rotary motion takes place via a linear translatory motion.

According to an aspect of the present invention, there is provided use of a device.

An embodiment of the present invention will, by way of example only, be explained in greater detail by the following detailed description of advantageous embodiments thereof with reference to the accompanying drawing figures.

BRIEF DESCRIPTION OF THE DRAWINGS

FIG. 1 illustrates a device according to SE-0401712-5, patent SE-527506. The driving body 1 here comprises an input drive shaft 1*a*, a drive pulley 1*b* connected thereto, a cylindrical gear wheel 4, a driving pin 1*c*, and a shaft 1*d* rigidly connected to the gear wheel 4. The cylindrical gear wheel 4 is in mesh with the drive pulley 1*b* by means of the driving pin 1*c*. An intermediate body 3 comprises an intermediate shaft 3*a* and a carrier element 15. The driven body 2 comprises a driven shaft 2*a* and a drum 16.

Figure 1:
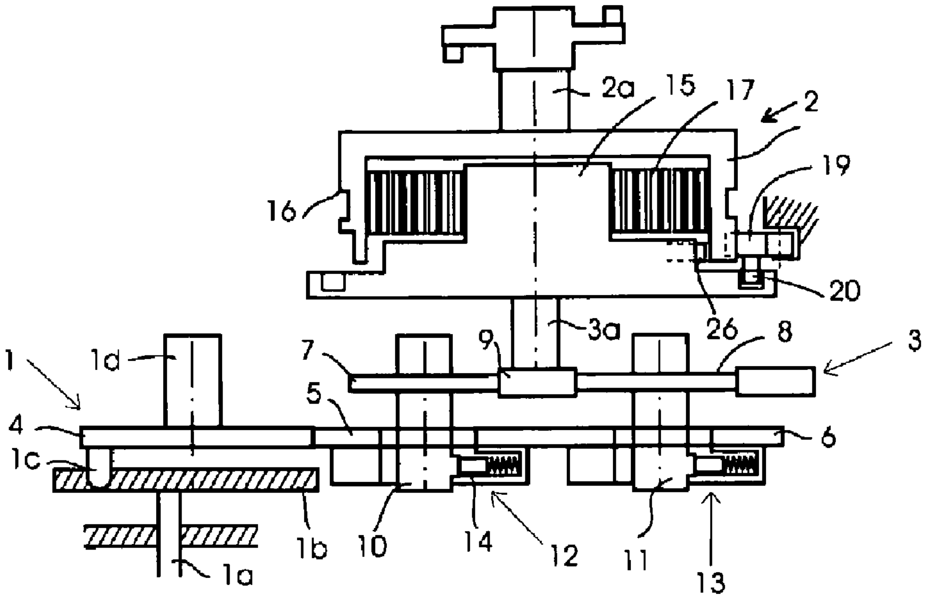
Fig 1 Prior Art
FIG. 1 is a longitudinal section through a device according to SE-0401712-5.

The gear wheel 4 is in mesh with the gear wheel 5, which in turn is in mesh with the gear wheel 6. Via a ratchet gearing 12 with a retaining pawl 14, the gear wheel 5 is connected to a shaft 10 that is rigidly connected to the gear wheel 7, and via a corresponding ratchet gearing 13, the gear wheel 6 is connected to a shaft 11 that is rigidly connected to the gear wheel 8. Each ratchet gearing 12, 13 is arranged to transmit rotary motion in a clockwise direction from the lower gear wheel to the respective upper one and to free-wheel, that is, allow relative rotation in case of rotary motion in a counterclockwise direction of the respective lower gear wheel. Each of the two upper gear wheels 7, 8 is in driving connection with a gear wheel 9 for transmission of rotary motion to the intermediate shaft 3.

The intermediate shaft 3*a* is thus always rotated in one and the same direction independently of whether the input drive shaft 1*a* is rotated in a clockwise or a counterclockwise direction.

The energy accumulator that connects the intermediate shaft 3*a* to the driven shaft 2*a* comprises a torsion spring of the flat helical spring type 17. This spring is supported at one end by a holding means on a drum 16 rigidly connected to the driven shaft 2*a*. The other end of the helical spring makes contact with a carrier element 15 rigidly connected to the intermediate shaft 3*a*. A catch 19 is designed to secure the drum 16 and hence also the driven shaft 2*a* against rotation. The catch is designed to be released by means of a release mechanism 20, allowing the drum 16 and the driven shaft to be rotated.

During operation, when the intermediate shaft 3*a* is rotated clockwise, the carrier element 15 accompanies the shaft in this motion, and, by its contact with the spring 17, it will tension the spring so as to achieve the necessary energy accumulation. The helical spring in the energy accumulator is always tensioned in one and the same direction of rotation. The release mechanism is designed to release the catch after a predetermined rotary motion, typically less than 360°, preferably about 310°. The spring mechanism results in a strong time ratio. Whereas the time for rotating the shaft 3 s may typically amount to about 5 seconds, the rotation of the driven shaft occurs for a period of approximately 0.2 seconds.

Figure 2:
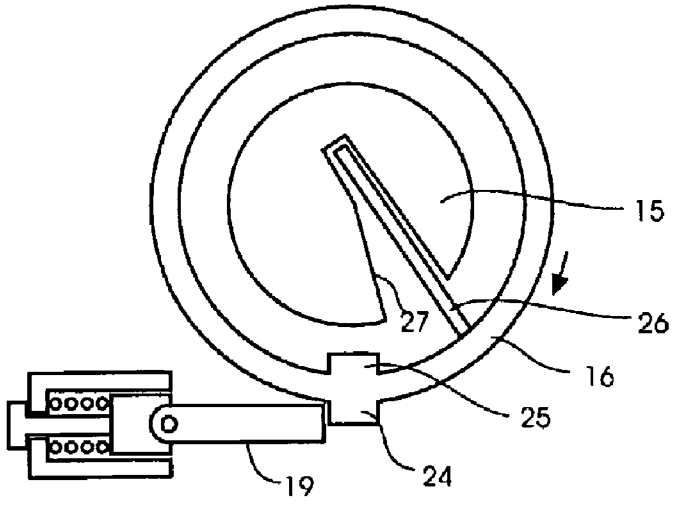
Fig 2 Prior Art
FIG. 2 illustrates a device for braking of part 16 in FIG. 1.

The drum 16, connected to the driven shaft 2*a*, is provided with a device for braking the rotation of the drum in the end position, that is, after almost one turn, whereby the braking power is transmitted to the carrier element 15 that is connected to the intermediate shaft 3*a*. This device is illustrated schematically in FIG. 2, which shows the device immediately before the catch is released to permit rotation of the drum 16. The drum 16 is provided with an outer lug 24 arranged on the outside and an inner lug 25 arranged on the inside. In the figure, the outer lug makes contact with the catch 19. In the carrier element 15, a brake spring 26 is mounted. The carrier element 15 exhibits a sector-shaped recess 27, which permits the brake spring 26 to be bent outwards and hence be tensioned.

When the drum 16 is released for rotation by releasing the catch 19, the drum will be rotated at a high speed in a clockwise direction in the figure until the inner lug of the drum 16 strikes against the brake spring 26.

When the lug 25 strikes against the brake spring 26, it results in the brake spring being bent in a clockwise direction in the figure, and in rotary motion being transmitted to the carrier element 15. When the carrier element rotates along, this results in the helical spring 17 (see FIG. 1) being tensioned again. This causes surplus energy from the drum 16 to be transferred to the helical spring 17 to be utilized for the next working stroke.

In this way, the drum 16 causes the carrier element 15 to rotate along with it until 360° has been completed, whereby the outer lug 24 of the drum strikes against the catch 19. When the rotary motion is transmitted to the carrier element 15 by the resilient stop via the brake spring according to the above, a motion impulse is imparted to the carrier element as well, this pulse propagating backwards in the drive system to the drive shafts 10 and 11, respectively, and to the corresponding gear wheels 5 and 6, respectively. Depending on the operation, the kinetic moment imparts a rotary pulse to the last driven gear wheel, which pulse ensures that the respective pawl 14, 13 again is engaged in a firm grip in the ratchet gearing 12 and 13, respectively.

Under extreme operating conditions, when the temperature of the oil is very low, for example −40° C. and thus has a relatively high viscosity, it has proved that said rotary pulse may become too weak to ensure the engagement in the ratchet gearing.

One object of the present invention is to provide an improved system for unidirection of the motion from the input drive shaft and transmission to the intermediate shaft 3 which, among other things, for its function is disengaged from the subsequent sequence of events and hence independent of extreme operating conditions.

DESCRIPTION OF THE INVENTION

Figure 3:
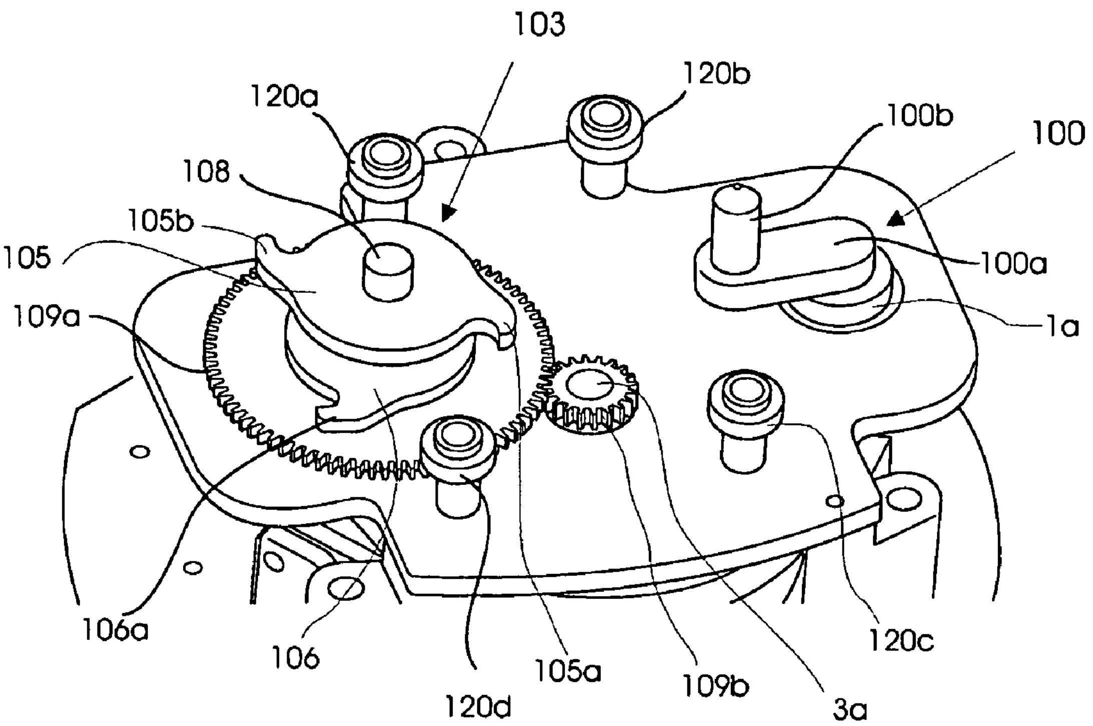
FIG. 3 illustrates part of the mechanical unidirecting device according to an embodiment of the invention.

FIG. 3 shows a view of part of the drive system according to an embodiment of the invention, wherein the drive shaft 1*a* of a diverter switch rotates in different directions in dependence on whether it is a question of increasing or reducing the tension of the transformer. The output intermediate shaft 3*a* is connected to an intermediate body 3 (FIG. 1), not shown, and the associated energy accumulation member as well as a driven body 2 with a driven shaft 2*a* (FIG. 1).

Figure 4:
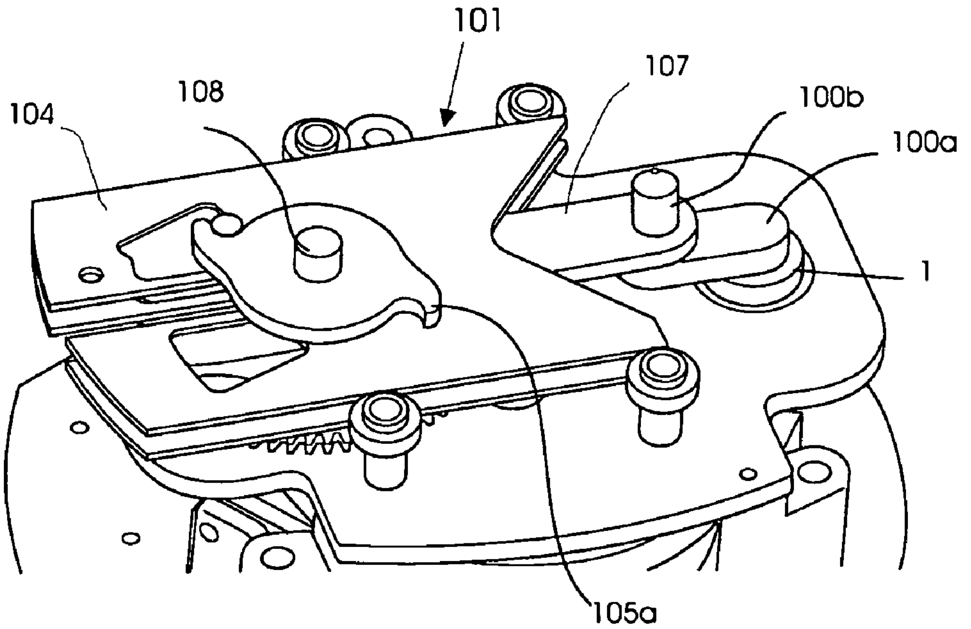
FIG. 4 illustrates part of the device of FIG. 3 with a carriage mounted thereon.

For transformation of the alternating rotary motion of the drive shaft 1*a* into a unidirected rotary motion of the driven shaft 2*a*, an intermediate motion member 101 (FIGS. 3 and 4) is connected to the drive shaft 1*a* via a crank mechanism 100. The alternating rotary motion of the drive shaft 1*a* is thus transformed into an alternating linear motion of the motion member 101. This member, in its turn, is provided with intervention means 102 for transforming the linear motion into a unidirected rotary motion of the intermediate shaft (3*a*) via the drive member 103.

The crank mechanism 100 consists of a crank disk 100*a* connected to the drive shaft 1*a*, said crank disk being connected to a crank pin 107. The crank pin is connected to the intermediate motion member 101 via a shaft pin 112, said member 101 comprising a movable carriage 104 provided with engagement means 102.

The engagement means 102 comprise a first pawl 114 and a second pawl 115, which are designed to transform the linear motion of the carriage 104 into a unidirected rotary motion of the drive member 103 by alternately engaging the drive member 103. This member comprises a shaft 108 provided with hook discs 105, 106 and a gear wheel 109*a* secured to the shaft, said gear wheel being in a conditioned driving connection with a gear wheel 109*b* applied to the intermediate shaft 3*a*.

According to an embodiment of the invention, the rotary motion from the drive shaft 1*a* is thus transmitted to an output shaft 108 of the drive member 103 via the movable carriage 4 (FIG. 4), which is arranged between an upper hook disk 105 and a lower hook disk 106. The hook disks 105 and 106 are each provided with diagonally applied projecting hooks 105*a*, 105*b* and 106*a*, 106*b*, respectively (hidden in the drawing). The hook disks are secured to the shaft 108 but displaced at an angle of 90° in relation to each other as is clear from FIG. 3. The shaft 108 is secured to a gear wheel 109*a*, which meshes with the gear wheel 109*b*. As is clear from FIG. 3, the gear wheels are in immediate mesh with each other but they may just as well be in a conditioned driving connection with each other by means of a chain mechanism (not shown).

Figure 5:
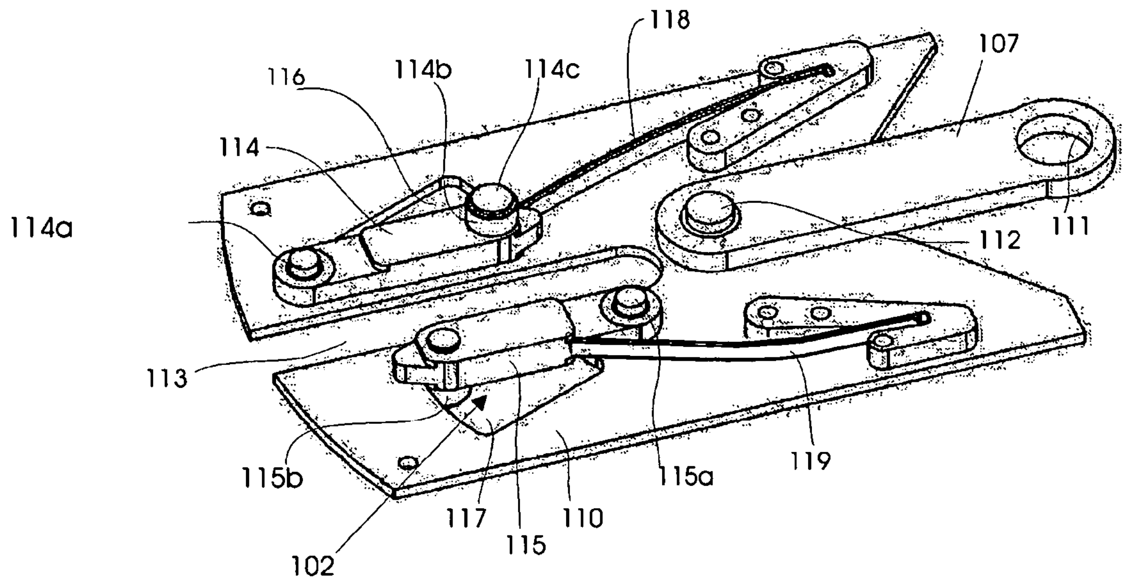
FIG. 5 illustrates part of the carriage in detail.

FIG. 5 shows part of the carriage 104 in detail. The carriage is provided with upper and lower cover plates 110, arranged in parallel, the upper one being removed in the figure. The connecting rod 107 is provided at one end with a circular bushing 111 fitting the crank pin 100*b* and at its other end movably journalled to a shaft pin 112 applied between the cover plates 110. The cover plates 110 are designed with a slot 113 with a width adapted to the diameter of the shaft 108.

On each side of and parallel to the slot and between the cover plates, a first pawl 114 and a second pawl 115 are arranged. Each pawl is journalled around pins 114*a* and 115*a*, respectively, arranged between the cover plates with the difference that the pin 114*a* of the first pawl is arranged at the opening of the slot 113 whereas the pin 115*a* of the second pawl is arranged at the inner end of the slot 113, which is clear from FIG. 5. At their inner journalled ends, the pawls are provided with runners 114*b* and 115*b*, respectively, running around shaft pins 114*c* and 115*c*, respectively (115*c* not being shown), arranged perpendicularly to the plane of the respective cover plate, wherein the runner 114*b* is arranged outside the upper cover plate 110 whereas the lower runner 115*b* is arranged outside the lower cover plate 110. Recesses 116 and 117 are provided in the upper and lower cover plates 110 in order to enable rotation of the respective pawl around the respective pin 114*a* and 115*a* parallel to the plane of the cover plate and in a direction out from the slot 113. Leaf springs 118 and 119 are arranged to resiliently press the respective pawl 114, 115 in a direction inwards towards the slot 113.

Since the pawls 114, 115 are symmetrically arranged in the carriage 104, it is realized that they may change places with retained function, so that the upper pawl 114 is applied with its pin 114*a* at the inner end of the slot if the lower pawl 115 is applied with its pin 115*a* at the opening of the slot. The gear wheels 109*a* and 109*b* have a gear ratio such that when gear wheel 109*a* moves one turn, the gear wheel 109*b* and the output intermediate shaft 3*a* move four turns.

The drive shaft 1*a*, which is mechanically connected to the motor device (not shown), performs, during each operation, a motion of half a revolution (180°) in either direction. By the rotation of the drive shaft 1*a*, a linear reciprocating motion between supporting rollers 120 *a, b, c, d* is imparted to the carriage 104 with the aid of the crank mechanism 100. During the reciprocating motion back or forth, either runner 114*b* or 115*b* engages with one of the hooks 114*a* or 114*b* of the upper hook disk, or, alternatively, the hook 115*a* or 115*b* of the lower hook disk, depending on which hook is in position. The opposite hook on the opposite side, which is not in engagement, then presses the corresponding runner into the recess 116 or 117.

Upon each half turn completed by the drive shaft 1*a*, the shaft 108 with the gear wheel 109*a* is rotated 90°, all the time in the same direction irrespective of the direction of rotation of the drive shaft 1*a*. Because of the gear ratio with the gear wheel 109*b*, a rotation of one full turn (360°) is imparted to the output intermediate shaft 3*a*.

The mode of operation will now be briefly described with reference to FIGS. 6*a-f*, which schematically show the sequence of motions.

In FIGS. 6*a-f* the upper hook disk 105 is shown in its entirety, whereas only the contours of the lower hook disk 106 are shown.

Figure 6A:
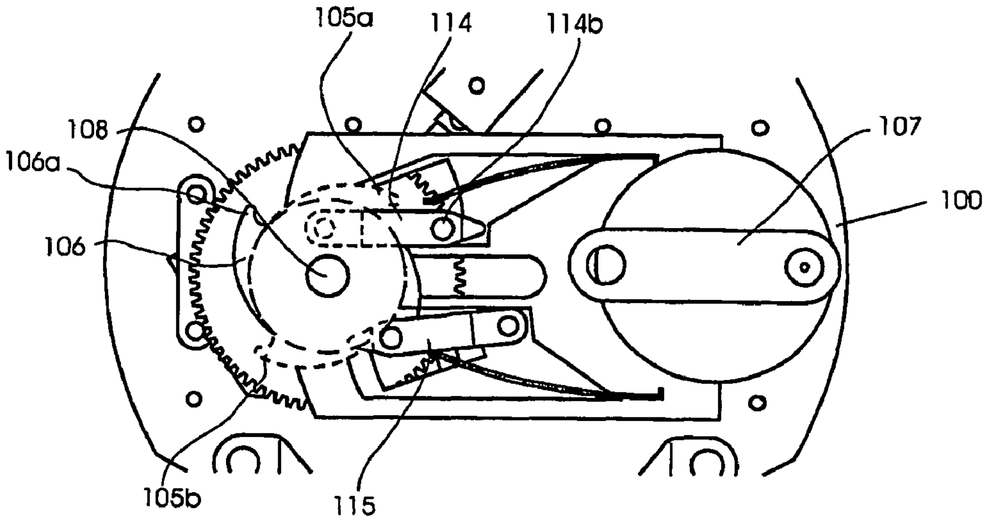
FIGS. 6*a-f* illustrate schematically the sequence of motions.

In FIG. 6*a*, the crank mechanism is in its rear position and the pawl 115 is in engagement with its runner 115*b* in the lower hook disk 106.

Figure 6B:
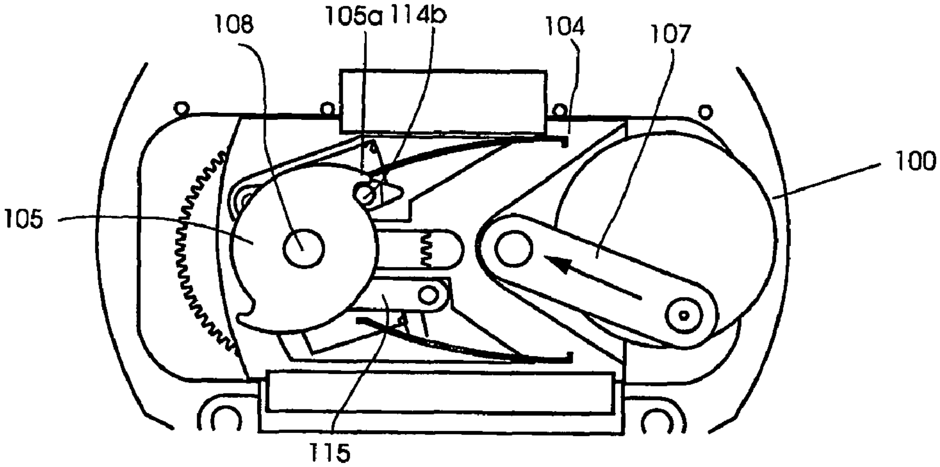

In FIG. 6*b*, the crank mechanism has rotated clockwise and the first pawl 114 with its runner 114*b* is in engagement with the hook 105*a* and imparts a counterclockwise rotary motion to the hook disk 105 (and the shaft 108).

Figure 6C:
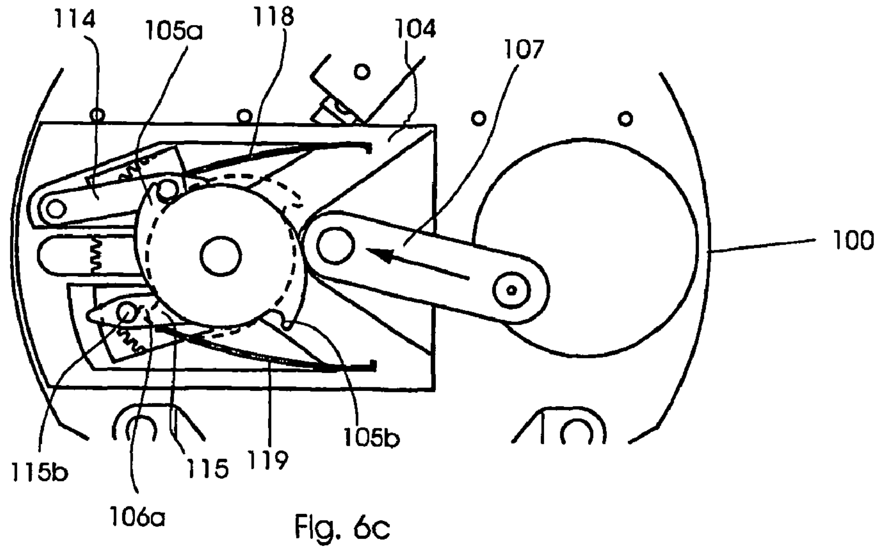

In FIG. 6*c*, the crank mechanism has rotated further in the clockwise direction, and the pawl 115 with its runner 115*b* has arrived at a limit position, where it is in the process of being pressed in, with the leaf spring 119, against the hook disk 106 to engage with its hook 106*a*.

Figure 6D:
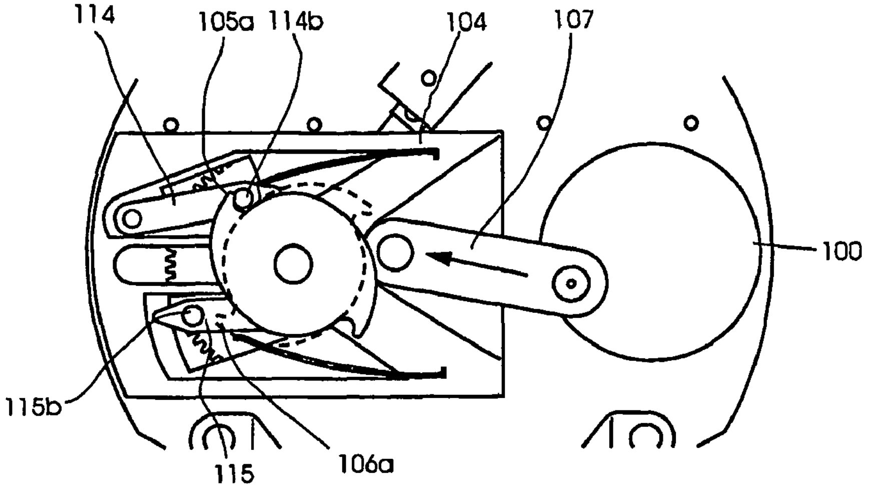

In FIG. 6*d*, the crank mechanism has rotated further in the clockwise direction, and the pawl 115 has been pressed into its innermost position in a direction towards the slot 113.

Figure 6E:
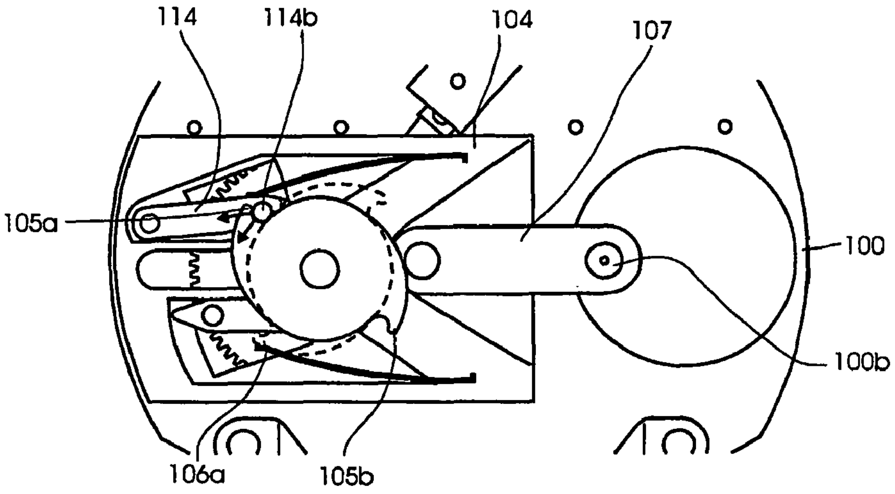

In FIG. 6*e*, the crank mechanism has rotated further in the clockwise direction to its remote position (108° from the initial position), and the pawl 114 has terminated driving the hook disk 105 at the hook 105*a*.

Figure 6F:
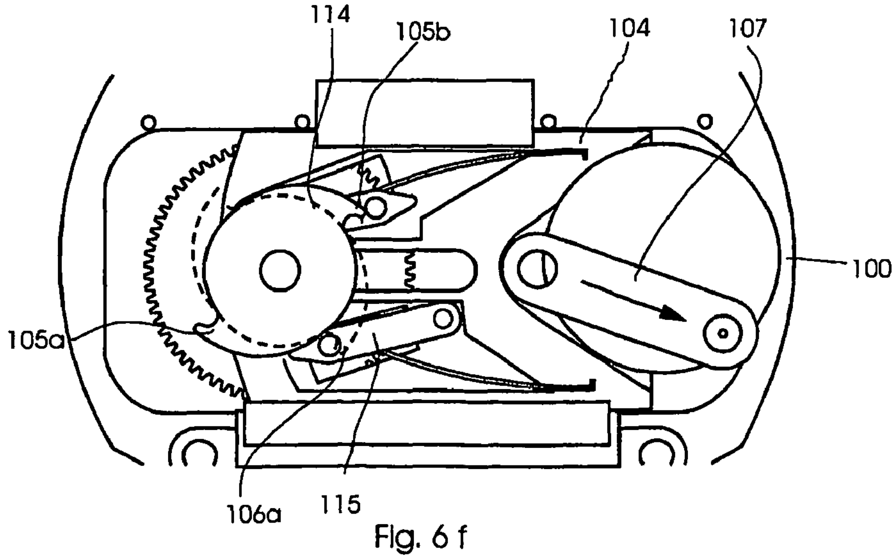

In FIG. 6*f*, the crank mechanism has started is counterclockwise rotation and it is the pawl 115 that drives the lower hook disk 106 (to the right in the figure) through the hook 106*a* and thus imparts a continued counterclockwise rotation to the shaft 108.

When the crank mechanism has arrived in its initial position (according to FIG. 6*a*), the cycle is repeated when the drive shaft 1*a* again rotates 180° in either direction.

It is realized that a unidirected rotary motion is imparted to the shaft 108 and to the intermediate shaft 3*a* connected to the shaft 108 via the gear wheels 109*a* and 109*b*, irrespective of the direction of the drive shaft 1*a*. Further, an overtravel in relation to the drive motion of the shaft 108 is imparted to the carriage 104 of the motion member 101, said overtravel being represented in the figure by the intermediate position of the carriage in FIGS. 6*a* to 6*b*, where the pawl 114 only enters into driving engagement with the upper hook disk 105 through the hook 105*a* in the position according to FIG. 6*b*. The corresponding overtravel of the carriage occurs when the carriage leaves the position according to FIG. 6*e* until the second pawl enters into engagement with the lower hook disk 106 through the hook 106*a*. Because of this overtravel, it is ensured that the rotary motion of the drive shaft 1*a* is always transformed to the necessary rotary motion of the intermediate shaft 3*a* and the energy accumulation member and is then transmitted to the driven body 2 via the driven shaft 2*a*. Depending on the mode of operation of the energy accumulation member, a freewheel (not shown) may be arranged in the drive system from the drive members 103 to the drive shaft 2*a* to allow rotation in one direction only, thus ensuring that the drive motion is not reversed.

Depending on the composition of the energy accumulation member, the intermediate shaft 3*a* and the associated intermediate body may, within the scope of the invention, form an integrated unit.

According to an aspect the invention also relates use of a device for transmitting rotary motion in a diverter switch for controlling a transformer, a reactor or a capacitor.

The invention claimed is:

1. A device for transmitting rotary motion in a diverter switch, said device comprising:

a motion-transmitting member for transforming an alternating rotary motion of a drive shaft into a unidirected rotary motion of a body driven about driven shaft, wherein the motion-transmitting member comprises an intermediate body that is rotatable about an intermediate shaft, a mechanical energy accumulation member connected to the driven body, said energy accumulation member being adapted to receive energy from the intermediate shaft, and a mechanical energy transmitting member configured to transmit the mechanical energy accumulated in the energy accumulation member to the driven body, an intermediate motion member, connected to the drive shaft with a crank mechanism, for transforming the alternating rotary motion into an alternating linear motion, said intermediate motion member comprising engagement member for transforming the linear motion into a unidirected rotary motion of the intermediate shaft via drive members, and wherein the motion member is designed to exhibit an overtravel in relation to the transmitted rotary motion.

2. The device according to claim 1, wherein the drive members comprise a shaft which, via gear wheels, is in a driving connection with the intermediate shaft.

3. The device according to claim 1, wherein the crank mechanism comprises a crank disk, secured to the drive shaft, with a connecting rod eccentrically journalled with a crank pin, said connecting rod being connected to the carriage by journals.

4. The device according to claim 2, wherein the intermediate motion member comprises a carriage and the engagement member comprises a first retaining pawl and a second retaining pawl adapted, during the reciprocating motion of the carriage, to alternately engage with hook disks secured to the shaft, thus imparting the unidirected rotary motion to the shaft.

5. The device according to claim 4, wherein the carriage is arranged between the upper hook disk and the lower hook disk.

6. The device according to claim 4, wherein the upper hook disk and the lower hook disk, respectively, comprise diametrically applied hooks and, respectively, and wherein the hook disks with their hooks are displaced 90° in relation to each other.

7. The device according to claim 4, wherein the first pawl and the second pawl of the carriage are journalled on the carriage at one of their ends with pins and at their other ends provided with runners.

8. The device according to claim 1, wherein at least 10% of the rotary motion of the drive shaft is adapted to contribute to the linear overtravel of the motion member.

9. The device according to claim 1, wherein the intermediate body forms an integral part of the energy accumulation member.

10. The device according to claim 1, wherein the drive shaft and the driven shaft are parallel.

11. Use of a device for transmitting rotary motion in a diverter switch according to claim 1 for controlling a transformer, a reactor or a capacitor.

12. A method for controlling a transformer, a reactor or a capacitor by transmitting rotary motion in a diverter switch, the method comprising:

transforming an alternating rotary motion of a drive shaft into a unidirected rotary motion of a body driven about driven shaft utilizing a motion-transmitting member, wherein the motion-transmitting member comprises an intermediate body that is rotatable about an intermediate shaft, a mechanical energy accumulation member connected to the driven body, said energy accumulation member being adapted to receive energy from the intermediate shaft, and a mechanical energy transmitting member configured to transmit the mechanical energy accumulated in the energy accumulation member to the driven body, and an intermediate motion member, connected to the drive shaft with a crank mechanism, for transforming the alternating rotary motion into an alternating linear motion, said intermediate motion member comprising engagement means for transforming the linear motion into a unidirected rotary motion of the intermediate shaft via drive members, and wherein the motion member is designed to exhibit an overtravel in relation to the transmitted rotary motion.

* * * * *